Patented Apr. 7, 1936

2,036,220

UNITED STATES PATENT OFFICE 2,036,220

METHOD OF PRODUCING ZIRCONIUM SILICATE

Charles J. Kinzie, Niagara Falls, N. Y., assignor to The Titanium Alloy Manufacturing Company, New York, N. Y., a corporation of Maine No Drawing. Application May 27, 1933, Serial No. 673,322

9 Claims. (Cl. 23—18)

My invention relates to novel treatment of ores containing zircon entangled with undesired substances to obtain a highly-refined zircon or zirconium silicate ($ZrSiO_4$), which will contain only minute amounts of impurities, such resulting product being employed in the arts, more particularly in making refractories, porcelains, etc. as well as for other industrial uses.

In United States Letters Patent No. 1,451,004 of April 10, 1923, in which I am a co-inventor, novel methods of treating ores containing zircon along with undesired substances are described so as to obtain a refined zircon containing silica about 36.86%; zirconia 61.50%; alumina 0.74%; iron oxide 0.17%; and titanic oxide 0.50%.

Such product as produced by the processes set forth in Patent No. 1,451,004 therefore yielded a refined zircon of approximately the following mineralogical composition: $ZrSiO_4$ approximately 91.30%; aluminum silicate 1.2%; and free silica 6.63%.

For many purposes this relatively large amount of free silica is detrimental, due to the fact that crystalline forms of free silica, such as are contained in zircon (quartz sand, etc.) have a disruptive effect when used in refractories, porcelains, etc., due to the well-known thermal property of crystalline silica to change in volume at different temperatures as well as to become altered as to its crystalline form.

I have now discovered new methods whereby the product of U. S. Patent No. 1,451,004 may be essentially freed of its contaminating silica, while at the same time additionally removing part of the remaining iron, titanium and other impurities, with the result that a new and useful zircon of hitherto unknown degree of purity is obtained.

My new methods consist essentially in mechanically separating the free silica, and part of other impurities from the lixiviated product set forth in Patent No. 1,451,004, and may be briefly described as follows:—

Zirconium silicate containing undesired impurities including iron and titanium minerals as well as free silica and other silicates (aside from zircon), and also usually containing rare earth phosphates, etc., is first heated with an alkali metal bisulphate (nitre cake, for example), in such proportions as will dissolve the iron and titanium minerals as well as will break up the contaminating rare earth phosphates, when the charge is heated to a suitable temperature for a suitable length of time, preferably in a batch type revolving furnace.

A suitable range of proportions in the charge is from ½ to 1¼ parts nitre cake ($NaHSO_4$) to 1 part raw zircon ore, heated at a temperature range from about 500° C. to about 700° C. from about 2 to 8 hours depending upon size of furnace and its charge as well as upon the temperatures maintained.

The reacted mass, preferably a fusion of the nitre cake with its dissolved impurities and suspended zircon grains, is then run from the furnace and cooled.

Such cooled mass is preferably crushed and then extracted with water and several types of impurities will remain:

(A) In solution will be found iron, titanium, sodium acid sulphate, sodium sulphate, and some rare earth impurities, which may be removed by simple settling and decantation.

(B) In suspension in the extract will be found double sulphates of rare earths and alkali metal; also a small amount of alkali metal, titanium, sulphate, as well as precipitated phosphates and fine silicon compounds. The suspended impurities cannot be removed readily by simple settling and decantation, but they are best removed by overflow washing or by suitable classifying treatments.

There will remain after treatments "A" and "B", free quartz and any grains of rutile, ilmenite, as well as other silicates escaping solution in the fusion operation.

This class of remaining impurities may be best removed by subjecting the material to mechanical concentration, as for example, on a wet table or other suitable wet concentrating devices which will separate same by the differences in specific gravity, grain-size, and rolling action of the zircon grains in contrast with the impurities which are to be removed from the zircon.

The product obtained after solution and washing out of dissolved matter, or after washing out of dissolved matter and floating off the suspended precipitated impurities, etc., should be dried and then subjected to suitable dry mechanical separating treatments to remove the free quartz and other impurities. For example, a controlled stream of washed and dried zircon, say 12 inches wide and say ⅛ inch thick is discharged from a suitable aperture past the path of a suitable blast of air of such velocity as to carry the minerals and impurities of lower specific gravity and greater air buoyancy away from the zircon grains.

Although I have mentioned somewhat briefly several alternative treatments, the following example will serve to illustrate a preferred procedure by means of which the new zircon product may be obtained.

*Example.*—Natural zirconium silicate ores, namely, zircon sands are used as the raw material. These sands are usually the result of mechanical and other concentration treatments. The sands in most instances occur in fine grains seldom larger than 30 mesh, and usually occur as loose separate grains. However, there are known deposits in which due to weathering and other natural influences, the zircon grains have become more or less cemented with bonding impurities, such as limonite (hydrated iron oxide). With such ores it may be desirable first to disintegrate by suitable mechanical or chemical means so as to destroy the bond and leave the zircon grains loose and free for the subsequent fusion treatment. However, the fusion treatment in itself would usually suffice to destroy the bond and free the zircon grains.

These zircon grains in any event should not be reduced finer than the naturally occurring sizes which as I have previously indicated are usually finer than 30 mesh. It should also be borne in mind that these natural zircon grains are usually colorless or but faintly colored, and although containing small amounts of impurities integral in the grains are, if freed from commingled impurities, sufficiently pure for many of the applications of commerce.

By using the zircon grains in sizes as occurring in nature and also by avoiding fine milling, two advantages accrue: (1) That practically no decomposition of the zircon occurs incidental to the fusion operation, while if the crude zircon were first milled, the fusion agent would then tend to dissolve some of the zircon which should be avoided: (2) The other advantage lies in the fact that if the zircon is introduced in the natural sizes and unground, it is then possible after fusion and extraction of dissolved impurities to separate mechanically solid impurities from the zircon. If the zircon were first milled, such mechanical separation would then be practically impossible. It is therefore quite essential in carrying out my invention that the crude zircon sands should be introduced in sizes as occurring in nature.

Such crude zircon as I have described is heated preferably in a rotary batch type furnace with an equal weight of nitre cake adjusting the time and temperature as I have hereinbefore described to yield the maximum degree of dissolving of commingled impurities, while not to any appreciable degree affecting the zircon grains. The fusion carrying the dissolved impurities and insoluble zircon and other matter is then removed from the furnace and cooled.

The partially cooled or cooled mass is preferably crushed to sizes of about two inches and finer, although the mass may be charged to the extractor in lumps twelve inches or larger in size. The melt is in practice cast on iron bed and allowed to become sufficiently solid to handle, and while still hot is crushed and charged to the extractor, while feeding in water and overflowing not only the dissolved impurities but also removing the light mineral substances as well as precipitated impurities. Whether it is hot or cold, or whether in twelve inch lumps or larger or smaller is relatively unimportant except from standpoint of rate of extraction.

The following chemical analysis of clear solution, obtained by separating it from the light insoluble substances etc., will serve to indicate the nature of dissolved substances.

*Composition of solution (grams per liter)*

| | |
|---|---|
| $SiO_2$ | Trace |
| $TiO_2$ | 7.32 |
| $Fe_2O_3$ | 1.02 |
| $Al_2O_3+P_2O_5$ | 1.17 |
| $Na_2O$ | 32.81 |
| $SO_3$ | 61.15 |
| Rare Earths—$ZrO_2$—etc. | 1.55 |

It will be observed that titanium is the predominating impurity derived from the ore. The $Na_2O$ and $SO_3$ are present from the fusion agent, and are partly combined in solution with the dissolved impurities.

The light mineral substances and precipitated impurities carried off in overflow along with above dissolved matter, but after separating, washing and drying, have approximately the following composition:—

| | Percent |
|---|---|
| Silica | 7.00 |
| $TiO_2$ | 14.00 |
| $Na_2O$ | 1.22 |
| $SO_3$ | 14.27 |
| $H_2O$ at 110° C | 1.04 |
| Ignition loss | 24.38 |
| Rare earths including small amounts of aluminum zirconium and phosphate calculated as $R_2O_3$ | 38.80 |
| Total | 100.71 |

This material when examined under petrographic microscope would show the following mineral composition which of course would include residual natural minerals altered or unaltered along with synthetic minerals (compounds), precipitates, etc.

| | |
|---|---|
| Free silica<br>Fine zirconium silicate | Total about 10% |
| Basic titanium sulphate and possibly a little sodium, titanium sulphate | About 20% |
| Sulphates and double sulphates of rare earths with sodium such as those of uranium, cerium, rubidium, ytterium, etc. | About 60% |
| Phosphates or possibly double phosphates of thorium, Zr. etc. | About 10% |

The above analysis and approximate mineral composition of light overflowed substances will illustrate what is removed by this treatment.

If the operation is stopped after washing out of dissolved salts and of the impurities which can be floated off by suitable overflow processes, the composition would be as in the following Analysis "C" as compared with crude ore (Analysis "A"), and with Analysis "B" as typical of what is disclosed in Patent No. 1,451,004.

However, in order to produce the zircon of desired purity, I then take the zircon as in Analysis "C", preferably while in wet state, and pass it over a suitable wet concentrating table along with suitable supply of water.

There will be discharged a major part of the feed, usually more than 80%, in form of essentially pure zircon grains as typified by Analysis "D", and also there will be discharged an impure fraction usually less than 15% of the feed of which Analysis "E" is typical.

It will be seen that these treatments have finally resulted in a zircon of hitherto unknown degree of purity and that overflow treatment alone is a marked improvement over the methods described in Patent No. 1,451,004.

*Chemical compositions*

|  | Crude ore | Pat. 1,451,004 | C | D | Tailings |
|---|---|---|---|---|---|
|  | A | B |  |  | E |
| Silicon (calculated as $SiO_2$) | 30.25 | 36.00 | 34.41 | 32.61 | 57.00 |
| Zirconium (calculated as $ZrO_2$) | 53.00 | 61.00 | 63.33 | 66.00 | 28.50 |
| Titanium (calculated as $TiO_2$) | 7.70 | 0.30 | 0.26 | 0.15 | 0.66 |
| Iron (calculated as $Fe_2O_3$) | 0.56 | 0.30 | 0.20 | 0.10 | 1.45 |
| Aluminum and rare earths, etc.) | 8.49 | 2.40 | 1.80 | 1.14 | 12.39 |
|  | 100.00 | 100.00 | 100.00 | 100.00 | 100.00 |

*Approximate mineralogical compositions*

|  | A | B | C | D | E |
|---|---|---|---|---|---|
|  | Percent | Percent | Percent | Percent | Percent |
| Zircon $ZrSiO_4$ | 79. | 90. | 94. | 98. | 43. |
| Rutile | 7 |  |  |  |  |
| Aluminum silicate | 5 | 4.00 | 2.0 | .75 | 6. |
| Free silica quartz, etc. | 3.0 | 4.00 | 3.0 | .50 | 40. |
| Ilmenite | 1 |  |  |  |  |
| Rare earth compounds in ore or residual from ore and synthetic compounds, including small amounts of iron and Ti. compounds other than rutile | 5. | 2. | 1.00 | .75 | 11. |
|  | 100.00 | 100.00 | 100.00 | 100.00 | 100.00 |

Although there may be occasionally a grain of either ilmenite or rutile escaping the reaction, this is so rare an occurrence as to be difficult to find, and therefore it may be assumed that the small amounts of titanium and iron are present chiefly as synthetic minerals formed in the fusion and possibly in the washing reactions. The amounts of these titanium and iron compounds range between 0.10 and 0.20% $TiO_2$, and between 0.05 and 0.15% $Fe_2O_3$ in Analysis "D" in the table of "Approximate Mineralogical Compositions".

The tailings (Analysis "E") would contain partially altered thorite as well as compounds of rare earths, residual minerals, or synthetically formed minerals that are not washed out by the overflow in the initial stages of my improved procedure.

The "Chemical Compositions" (A—E) should not be confused with the corresponding "Approximate Mineralogical Compositions" (A—E), since in the former the sample is brought into solution and the various elements shown as oxides irrespective as to how they existed or may have been combined; on the other hand in the latter is shown the manner of combination and the minerals present with approximate percentages, but nevertheless the results always are only approximate.

The improved zircon product as in Analysis "C" has resulted in the accomplishment of results in super-refractories, ceramics, and in other fields that are not possible with the refined zircon product of Patent No. 1,451,004, while the added improvement of final mechanical concentration as shown in Analysis "D" in order to free same of quartz and other remaining impurities will enable the extension of my purified zircon into applications not possible with the zircon of Analysis "B" or Analysis "C".

I claim as my invention:—

1. The method of producing zirconium silicate from the treatment of ores containing zircon commingled with impurities which comprises heating said ores mixed with an alkali metal bisulphate to render said impurities capable of mechanical separation from the natural zircon grains without decomposing the latter, lixiviating the resulting mass with water, removing the dissolved salts and precipitated impurities by elutriation, drying the undecomposed zircon residue grains and finally subjecting the dried and elutriated zircon residue containing less than 97% $ZrSiO_4$ to concentration by dry separation to remove therefrom substantially all free silica and other remaining impurities.

2. The method of producing zirconium silicate from the treatment of ores containing zircon commingled with impurities, which comprises heating said ores mixed with nitre cake to render said impurities capable of mechanical separation from the natural zircon grains without decomposing the latter, lixiviating the resulting mass with water, removing the dissolved salts and precipitated impurities by elutriation, drying the undecomposed zircon residue grains and finally subjecting the dried and elutriated zircon residue containing less than 97% $ZrSiO_4$ to mechanical concentration by dry separation to remove therefrom substantially all free silica and other remaining impurities.

3. In the method of producing zirconium silicate containing +97% $ZrSiO_4$ from treatment of ores containing zircon commingled with impurities, the steps which consists in heating said ores with nitre cake to render said impurities capable of mechanical separation from the natural zircon grains without decomposing the latter, cooling the resulting mass with extraction of dissolved salts with water, washing the residual $ZrSiO_4$ by elutriation to remove finely-divided and light impurities from the undecomposed zircon grains and drying same, then mechanically concentrating by dry separation such dried natural zircon residue to remove substantially all free silica and other remaining decomposed impurities.

4. In the method of producing zirconium silicate containing +97% $ZrSiO_4$ from treatment of ores containing zircon commingled with impurities, the steps which consists in heating said ores with nitre cake to render said impurities capable of mechanical separation from the natural zircon grains without decomposing the latter, cooling the resulting mass with extraction of dissolved salts with water, washing the residual $ZrSiO_4$ by elutriation to remove finely-divided and light impurities, and then agitating the washed zircon residue in the presence of water to separate the natural undecomposed zircon grains not less than 80% of which are between —35 and 325 mesh from substantially all free silica and other remaining impurities.

5. In the method of producing zirconium silicate containing more than 97% $ZrSiO_4$ from zircon ores commingled with impurities, the steps which consist in heating the ore mixed with an alkali metal bisulphate to render said impurities capable of mechanical separation from the natural zircon grains without decomposing the latter, cooling the reacted mass, lixiviating to remove alkali sulphate and other dissolved salts drying the undecomposed zircon residue grains, and subjecting said residue grains containing less than 97% ZrSiO$_4$ to mechanical concentration by dry separation to remove therefrom substantially all the silica and other remaining impurities resulting from such treatment.

6. In the method of producing zirconium silicate containing more than 97% ZrSiO$_4$ from zircon ores commingled with impurities, the steps which consist in heating the ore mixed with nitre cake to render said impurities capable of mechanical separation from the natural zircon grains without decomposing the latter, cooling the reacted mass, lixiviating to remove sodium sulphate and other dissolved salts drying the undecomposed zircon residue grains, and subjecting said residue grains containing less than 97% ZrSiO$_4$ to mechanical concentration by dry separation to remove therefrom substantially all the silica and other remaining impurities resulting from such treatment.

7. In the method of producing zirconium silicate containing more than 97% ZrSiO$_4$ from zircon ores commingled with impurities, the steps which consist in heating the ore mixed with nitre cake to render said impurities capable of mechanical separation from the natural zircon grains without decomposing the latter, cooling the reacted mass, lixiviating to remove sodium sulphate and other dissolved salts, and agitating the residue in the presence of water to separate the natural undecomposed zircon grains not less than 80% of which are between —35 and 325 mesh from substantially all the free silica and other remaining impurities therefrom.

8. In the method of producing zirconium silicate from heating natural zircon ores commingled with impurities mixed with an alkali metal bisulphate to render said impurities capable of mechanical separation from the natural zircon grains without decomposing the latter and lixiviating the resulting mass with removal of dissolved salts and precipitated impurities from the natural zircon grains, the step which consists in mechanically concentrating by dry separation the zircon residue to remove therefrom substantially all free silica and other decomposed impurities to obtain a natural zircon granular product containing more than 97% ZrSiO$_4$.

9. In the method of producing zirconium silicate from heating natural zircon ores commingled with impurities mixed with an alkali metal bisulphate to render said impurities capable of mechanical separation from the natural zircon grains without decomposing the latter and lixiviating the resulting mass with removal of dissolved salts and precipitated impurities from the natural zircon grains, the step which consists in agitating the zircon residue in the presence of water to separate the natural undecomposed zircon grains from substantially all free silica and other decomposed impurities to obtain a natural zircon granular product not less than 80% of which is between —35 and 325 mesh and containing more than 97% ZrSiO$_4$.

CHARLES J. KINZIE.